(12) United States Patent
Saitoh et al.

(10) Patent No.: US 7,122,617 B2
(45) Date of Patent: Oct. 17, 2006

(54) POLYBENZAZOLE PRECURSOR FILM, POLYBENZAZOLE FILM AND METHOD OF PRODUCING THE SAME

(75) Inventors: Fumio Saitoh, Tokyo (JP); Toru Kimura, Funabashi (JP); Masayuki Tobita, Isesaki (JP); Masatoshi Hasegawa, Chiba (JP)

(73) Assignee: Polymatech Co., Ltd., Tokyo (JP)

( * ) Notice: Subject to any disclaimer, the term of this patent is extended or adjusted under 35 U.S.C. 154(b) by 0 days.

(21) Appl. No.: 10/627,353

(22) Filed: Jul. 25, 2003

(65) Prior Publication Data
US 2005/0249961 A1    Nov. 10, 2005

(30) Foreign Application Priority Data

Jul. 25, 2002 (JP) ............................. 2002-217086
Jun. 12, 2003 (JP) ............................. 2003-168084

(51) Int. Cl.
C08G 69/26    (2006.01)
C08G 69/28    (2006.01)
C08G 63/44    (2006.01)

(52) U.S. Cl. ................. 528/288; 528/272; 264/233; 264/291; 264/344; 264/289.6; 264/290.2; 428/1

(58) Field of Classification Search ............. 264/233, 264/291, 344, 289.6, 290.2; 428/1; 528/183, 528/288
See application file for complete search history.

(56) References Cited

U.S. PATENT DOCUMENTS 4,668,448 A    5/1987    Weber et al. ............... 264/22

FOREIGN PATENT DOCUMENTS

| EP | 0 171 017 A2 | 2/1986 |
| EP | 0 172 012 | 2/1986 |
| EP | 0 990 673 A2 | 4/2000 |
| JP | 63-074612 | 4/1988 |
| JP | 04-202257 | 7/1992 |
| JP | 6-503521 | 4/1994 |
| JP | 7-13168 | 1/1995 |
| JP | 11-171993 | 6/1999 |
| JP | 2000-273214 | 10/2000 |
| JP | 2001-011311 | 1/2001 |
| WO | WO 93/06191 | 4/1993 |
| WO | WO 93/23460 | 11/1993 |
| WO | WO 95/19386 | 7/1995 |

*Primary Examiner*—Duc Truong
(74) *Attorney, Agent, or Firm*—Fish & Richardson P.C.

(57) ABSTRACT

The first film of the present invention is a film produced by solidifying a polybenzazole precursor that has been oriented in a given direction by the application of a magnetic or electric field. The second film of the present invention is a film produced by solidifying a polybenzazole that has been oriented in a given direction by the application of a magnetic or electric field. The first and second films have a strong anisotropy.

27 Claims, 2 Drawing Sheets

POLYBENZAZOLE PRECURSOR FILM, POLYBENZAZOLE FILM AND METHOD OF PRODUCING THE SAME

BACKGROUND OF THE INVENTION

The present invention relates to a film formed of a polybenzazole precursor or a polybenzazole.

A polybenzazole film formed of a polybenzazole has high strength and high modulus of elasticity; moreover, it has excellent heat resistance and flame retardance. Therefore, a large number of improved polybenzazole films, including those disclosed in the patent documents described below, have been proposed with the object of using them for novel applications, such as magnetic tapes, insulating films for electronic components, and liquid crystal alignment layers.

Japanese Laid-Open Patent Publication No. 4-202257 discloses a polybenzazole film with improved homogeneity, which is made up of a composition containing a polybenzazole and a specific polymer. Japanese Laid-Open Patent Publication No. 11-171993 discloses a polybenzazole film with improved smoothness, which has a specified surface roughness. Japanese Laid-Open Patent Publication No. 2000-273214 discloses a polybenzazole film with improved mechanical properties, which has a specified elongation and a specified Young's modulus. Japanese Laid-Open Patent Publication No. 2001-11311 discloses a polybenzazole film with improved light resistance, which contains a polybenzazole and a specific anthraquinone compound. Japanese Laid-Open Patent Publication No. 63-74612 discloses a polybenzazole film with improved tear strength, which is produce by a specific production method. Japanese National Phase Laid-Open Patent Publication No. 6-503521 discloses a mechanically oriented polybenzazole film.

In recent years, there have been demands that polybenzazole films, particularly those used for semiconductor package materials and electronic devices, have not only high strength, high modulus of elasticity, and high heat resistance, but also anisotropies such as optical anisotropy, magnetic anisotropy, mechanical anisotropy, thermal anisotropy, and electrical anisotropy. However, none of the polybenzazole films disclosed in the above patent documents has strong anisotropies.

SUMMARY OF THE INVENTION

Accordingly, it is an objective of the present invention to provide a film having strong anisotropies and a method of producing the same.

To achieve the foregoing and other objectives and in accordance with the purpose of the present invention, a film formed of a polybenzazole precursor is provided. The film is produced by solidifying the polybenzazole precursor oriented in a given direction by the application of a magnetic or electric field. The polybenzazole precursor has a repeating unit shown by the following chemical formula (1) or (2).

The present invention also provides a method of producing a film formed of a polybenzazole precursor. The polybenzazole precursor has a repeating unit shown by the following chemical formula (1) or (2). The method includes: preparing a liquid containing the polybenzazole precursor; spreading the liquid in the form of a film; applying a magnetic or electric field to the spread liquid so that the polybenzazole precursor in the spread liquid is oriented in a given direction; and solidifying the spread liquid after the application of the magnetic or electric field.

The present invention further provides a film formed of a polybenzazole. The film is produced by solidifying the polybenzazole oriented in a given direction by the application of a magnetic or electric field.

Furthermore, the present invention provides a method of producing a film formed of a polybenzazole. The method includes: preparing a liquid containing a polybenzazole precursor, as a precursor of the polybenzazole; spreading the liquid in the form of a film; applying a magnetic or electric field to the spread liquid so that the polybenzazole precursor in the spread liquid is oriented in a given direction; chemically converting the polybenzazole precursor in the spread liquid into the polybenzazole after the application of the magnetic or electric field; and solidifying the spread liquid after the chemical conversion of the polybenzazole precursor into the polybenzazole. The polybenzazole precursor has a repeating unit shown by the following chemical formula (1) or (2).

The present invention provides another method of producing a film formed of a polybenzazole. The method includes: preparing a liquid containing a polybenzazole precursor, as a precursor of the polybenzazole; spreading the liquid in the form of a film; applying a magnetic or electric field to the spread liquid so that the polybenzazole precursor in the spread liquid is oriented in a given direction; solidifying the spread liquid after the application of the magnetic or electric field so as to produce a precursor film, as a film of the polybenzazole precursor; and chemically converting the polybenzazole precursor contained in said precursor film into the polybenzazole. The polybenzazole precursor has a repeating unit shown by the following chemical formula (1) or (2).

The present invention provides yet another method of producing a film formed of a polybenzazole. The method includes: preparing a liquid containing the polybenzazole; spreading the liquid in the form of a film; applying a magnetic or electric field to the spread liquid so that the polybenzazole in the spread liquid is oriented in a given direction; and solidifying the spread liquid after the application of the magnetic or electric field.

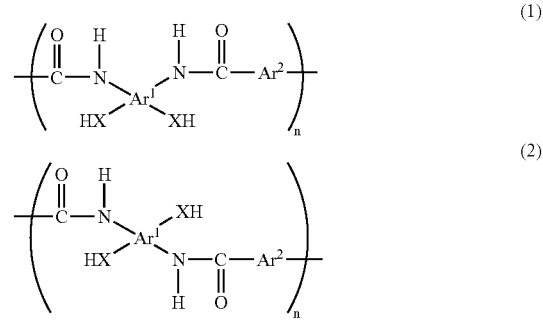

In the chemical formulae (1) and (2), X is any one selected from the group consisting of a sulfur atom, an oxygen atom, and an imino group; $Ar^1$ and $Ar^2$ are selected from aromatic hydrocarbon groups; and n is an integer of 10 to 500.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described.

Figure 1:
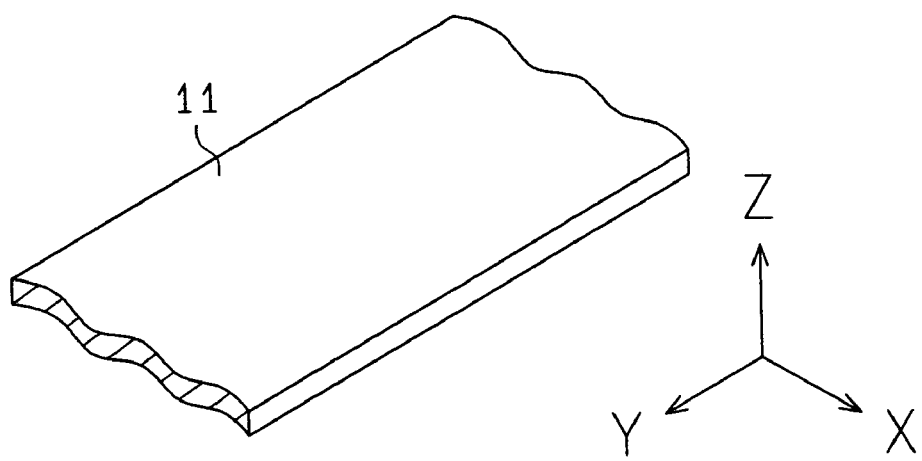
FIG. 1 is a perspective view showing part of a film according to a first embodiment of the present invention.

A film 11 according to the first embodiment of the present invention shown in FIG. 1 is formed of polybenzazole precursor, which is polyhydroxyamide, having a repeating unit shown by the following chemical formula (1) or (2).

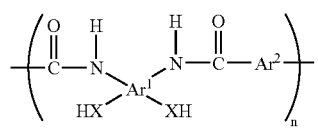
(1)

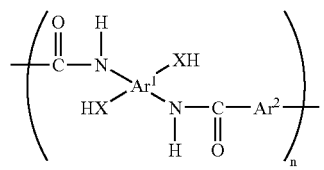
(2)

In the chemical formulae (1) and (2), X is any one selected from the group consisting of a sulfur atom, an oxygen atom, and an imino group; $Ar^1$ is an aromatic hydrocarbon group shown by, for example, any one of the following chemical formulae (12) to (15); $Ar^2$ is an aromatic hydrocarbon group shown by, for example, any one of the following chemical formulae (8) to (11); and n is an integer of 10 to 500.

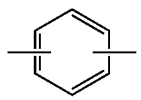
(8)

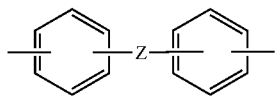
(9)

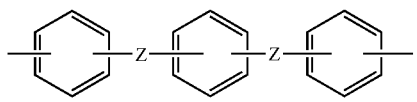
(10)

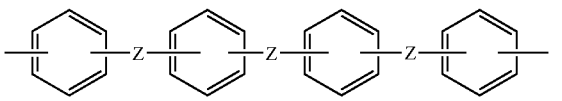
(11)

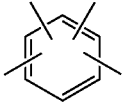
(12)

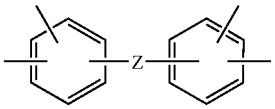
(13)

(14)

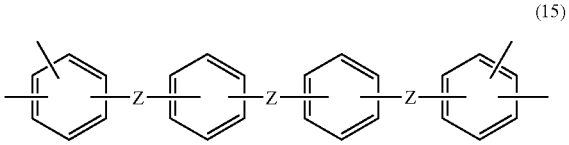
(15)

In the chemical formulae (9) to (11) and (13) to (15), Z is any one selected from the group consisting of a sulfur atom, an oxygen atom, $SO_2$, CO, $CH_2$, $C(CH_3)_2$, $CF_2$, and $C(CF_3)_2$. Z may be omitted; but in that case, carbon atoms in the adjacent benzene rings are directly bound to each other. Hydrogen atoms bound to carbon atoms in the benzene rings in the chemical formulae (8) to (15) may be replaced by lower alkyl groups, lower alkoxyl groups, halogen atoms, or alkyl halide groups such as trifluoromethyl group.

The aforementioned polybenzazole precursor is obtained by the condensation reaction between a dicarboxylic acid having the following formula (5) or the amide-forming derivative thereof, as an acidic constituent, and a compound having the following formula (6) or (7), as an amino-basic constituent.

(5)

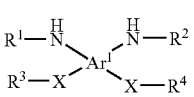
(6)

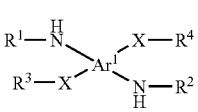
(7)

In the reaction between the acidic constituent and the amino-basic constituent, the NH—$R^1$ group and NH—$R^2$ group in the amino-basic constituent react in preference to the X—$R^3$ group and X—$R^4$ group in the amino-basic constituent. Therefore, the resultant polybenzazole precursor has a repeating unit shown by the formula (1) or (2).

$Ar^2$ in the formula (5) is an aromatic hydrocarbon group shown by, for example, any one of the formulae (8) to (11).

Concrete examples of dicarboxylic acids shown by the formula (5) are aromatic dicarboxylic acids such as phthalic acid, isophthalic acid, terephthalic acid, 3,3'-dicarboxydiphenyl ether, 3,4'-dicarboxydiphenyl ether, 4,4'-dicarboxydiphenyl ether, 3,3'-dicarboxydiphenylmethane, 3,4'-dicarboxydiphenylmethane, 4,4'-dicarboxydiphenylmethane, 3,3'-dicarboxydiphenyldifluoromethane, 3,4'-dicarboxydiphenyldifluoromethane, 4,4'-dicarboxydiphenyldifluoromethane, 3,3'-dicarboxydiphenyl sulfone, 3,4'-dicarboxydiphenyl sulfone, 4,4'-dicarboxydiphenyl sulfone, 3,3'-dicarboxydiphenyl sulfide, 3,4'-dicarboxydiphenyl sulfide, 4,4'-dicarboxydiphenyl sulfide, 3,3'-dicarboxydiphenyl ketone, 3,4'-dicarboxydiphenyl ketone, 4,4'-dicarboxydiphenyl ketone, 2,2-bis(3-carboxyphenyl)propane, 2,2-(3,4'-dicarboxydiphenyl)propane, 2,2-bis(4-carboxyphenyl)propane, 2,2-bis(3-carboxyphenyl)hexafluoropropane, 2,2-(3,4'-dicarboxydiphenyl)hexafluoropropane, 2,2-bis(4-carboxydiphenyl)hexafluoropropane, 1,3-bis(3-carboxyphenoxy)benzene, 1,4-bis(3-carboxyphenoxy)benzene, 1,4-bis(4-carboxyphenoxy)benzene, 3,3'-[1,4-phenylenebis(1-methylethylidene)bisbenzoic acid, 3,4'-[1,4-phenylenebis(1-methylethylidene)bisbenzoic acid, 4,4'-[1,4-phenylenebis(1-methylethylidene)bisbenzoic acid, bis[4-(3-carboxyphenoxy)phenyl]sulfide, bis[4-(4-carboxyphenoxy)phenyl]sulfide, bis[4-(3-carboxyphenoxy)phenyl]sulfone, and bis[4-(4-carboxyphenoxy)phenyl]sulfone.

Concrete examples of the aforementioned amide-forming derivatives are dihalides (e.g. dichlorides and dibromides) of dicarboxylic acids shown by the formula (5) and dialkyl esters (e.g. dimethyl ester and diethyl ester) of dicarboxylic acids shown by the formula (5).

The acidic constituent reacted with the amino-basic constituent may be made up of a single kind of compound or a mixture of two or more kinds of compounds.

In the formulae (6) and (7), X is any one selected from the group consisting of a sulfur atom, an oxygen atom, and imino group; $Ar^1$ is selected from aromatic hydrocarbon groups shown by, for example, the above chemical formulae (12) to (15); and $R^1$ to $R^4$ are selected from the group consisting of trialkylsilyl groups, such as trimethylsilyl group, triethylsilyl group, and tripropylsilyl group, and hydrogen atom.

Preferably at least $R^1$ and $R^2$ are selected from trialkylsilyl groups; in that case, a polybenzazole precursor having a large molecular weight is easy to obtain. When at least either one of $R^1$ to $R^4$ is a trialkylsilyl group, the compounds shown by the formulae (6) and (7) are trialkylsilylated diamines. Trialkylsilylated diamines are prepared in accordance with the method of producing 3,3'-bis(trimethylsiloxy)-4,4'-bis(trimethylsilylamino)biphenyl, which is disclosed in Macromolecules (vol. 21, 1988): 2305.

Concrete examples of the compounds shown by the formula (6) or (7) are 3,4-diamino-1,5-benzenediol, 3,3'-dihydroxy-4,4-diaminobiphenyl, 3,3'-diamino-4,4'-dihydroxybiphenyl, 2,2'-bis(3-amino-4-hydroxyphenyl) ketone, 2,2'-bis(3-amino-4-hydroxyphenyl) sulfide, 2,2'-bis(3-amino-4-hydroxyphenyl) ether, 2,2'-bis(3-hydroxy-4-aminophenyl) sulfone, 2,2-bis(3-amino-4-hydroxyphenyl)propane, 2,2-bis(3-hydroxy-4-aminophenyl)propane, 2,2-bis(3-hydroxy-4-aminophenyl)methane, 2,2-bis(3-amino-4-hydroxyphenyl)hexafluoropropane, 2,2-bis(3-hydroxy-4-aminophenyl)hexafluoropropane, and 2,2-bis(3-amino-4-hydroxyphenyl)difluoropropane, and the trialkylsilylated compounds thereof. The amino-basic constituent reacted with the acidic constituent may be made up of a single kind of compound or a mixture of two or more kinds of compounds.

A solution of the polybenzazole precursor prepared by dissolving the polybenzazole precursor in a solvent usually has optical anisotropy. This is because the polybenzazole precursor forms a liquid crystal or a spherulite in the solution.

In the aforementioned film 11, the polybenzazole precursor is oriented in a given direction. Accordingly, the film 11 has at least one of optical anisotropy, magnetic anisotropy, mechanical anisotropy, thermal anisotropy, and electrical anisotropy. When the film has magnetic anisotropy, the polybenzazole precursor functions as a π electron conjugated system molecule.

The direction and degree of orientation of the polybenzazole precursor in the film 11 can be known by measuring the optical anisotropy, that is, the anisotropy related to the phase difference in birefringence of the film 11, or by analyzing the polarized infrared absorption spectrum. The optical anisotropy of the film 11 can be measured with a polarizing microscope or with two polarizers. The above direction and degree can also be known by polarized Raman spectroscopy, X-ray diffractometry, electron diffractometry, or observation under an electron microscope.

Now the method using the analysis of the polarized infrared absorption spectrum will be described. When the film 11 is exposed to polarized infrared rays, if the orientation direction of the polybenzazole precursor and the polarization direction of the polarized infrared rays correspond to each other, large absorption occurs in the film 11, whereas if the orientation direction and the polarization direction do not correspond to each other, small absorption occurs. Accordingly, the orientation direction of the polybenzazole precursor in the film 11 can be determined by measuring the amount of polarized infrared rays absorbed into the film 11 while changing the polarization direction of the polarized infrared rays to which the film 11 is exposed.

The thickness of the film 11 is preferably 1 μm to 2 mm. A film that is less than 1 μm thick is susceptible to fracture. A film that is more than 2 mm thick increases production costs.

The film 11 is used as, for example, an insulating film for semiconductor, a base material for printed wiring boards, a sealing material, an alignment layer for displays, a base material for polarized films, a base material for magnetic recording films, a base material for condensers, a solar battery, a flat heating element, a film for electromagnetic-wave preventive measures, a sensor, an actuator, a material for batteries, a material for package, a gas barrier material, a base material for laminated films, a filter, and a separation film.

Now the method of producing the film 11 will be described.

In the production of the film 11, first, an acidic constituent and an amino-basic constituent are reacted with each other in a solvent, preferably at 80° C. or lower, more preferably at 50° C. or lower, to prepare a polybenzazole precursor solution. Preferably the molarities of the acidic constituent and the amino-basic constituent added to the solvent are the same or approximately the same.

Solvents usable as the above solvent include, for example, organic polar solvents, such as N,N-dimethylformamide, N,N-dimethylacetamide, N-methyl-2-pyrrolidone, dimethyl sulfoxide, hexamethylphosphoramide, and chlorobenzene, and polyphosphoric acid. The solvent may be made up of either a single kind of solvent or a mixture of two or more kinds of solvents. The solvent may contain toluene, xylene, cellosolve acetate, and methyl cellosolve, if necessary.

The concentration of the polybenzazole precursor in the above polybenzazole precursor solution is preferably 2 to 30% by weight, more preferably 3 to 20% by weight, and much more preferably 5 to 20% by weight. If the concentration is less than 2% by weight, sometimes the polybenzazole precursor does not form a liquid crystal or spherulite in its solution; as a result, it becomes hard to obtain a film 11 in which the polybenzazole precursor is oriented in a given direction with certainty. On the other hand, if the concentration of the polybenzazole precursor is more than 30% by weight, the viscosity of the polybenzazole precursor solution becomes too high; as a result, the polybenzazole precursor becomes hard to orient in a given direction.

Figure 2:
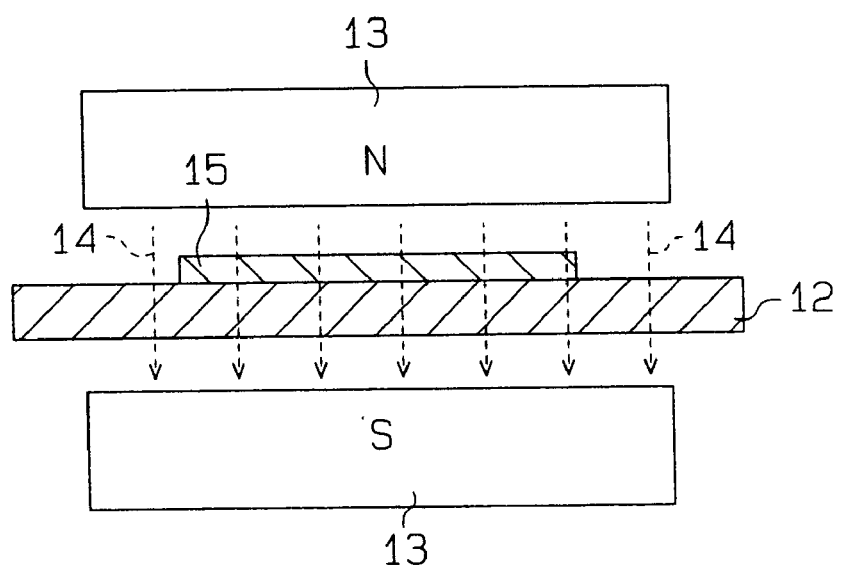
FIG. 2 is a schematic view showing a production process of the film of FIG. 1.

The polybenzazole precursor solution prepared as above is then applied on a substrate 12, such as a glass substrate (see FIG. 2). The application of the polybenzazole precursor solution is carried out by a coating method, such as cast coating, dip coating, print coating, spray coating, or spin coating. Preferably, the surface of the substrate 12 undergoes surface treatment in advance with, for example, a silane coupling agent or titanium coupling agent, so that the adhesion between the substrate 12 and the polybenzazole precursor solution is improved.

Figure 3:
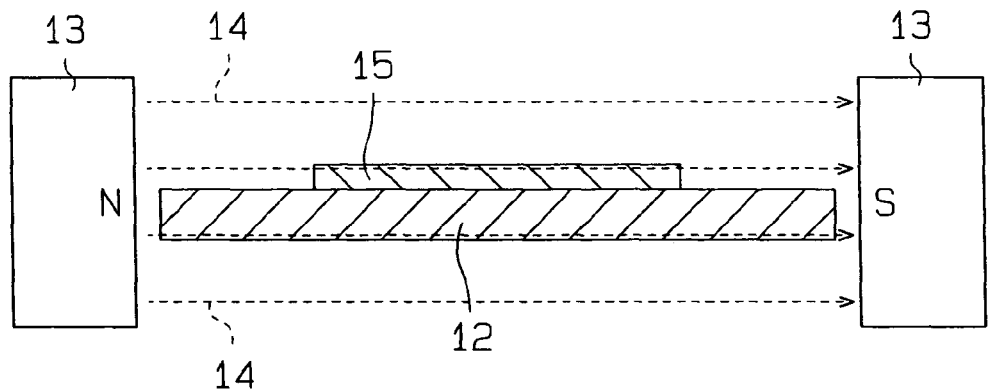
FIG. 3 is a schematic view showing another production process of the film of 1.

Then, a magnetic field is applied to the polybenzazole precursor solution having been applied on the substrate 12, that is, an unsolidified film 15 (see FIG. 2). When producing a film 11 in which the polybenzazole precursor is oriented in the direction of the film's thickness (in the Z-axis direction of FIG. 1), the unsolidified film 15 is arranged between a pair of permanent magnets 13 having been arranged vertically in parallel, as shown in FIG. 2. On the other hand, when producing a film 11 in which the polybenzazole precursor is oriented in the direction perpendicular to that of the film's thickness (e.g. in the X-axis and Y-axis directions of FIG. 1), the unsolidified film 15 is arranged between a pair of permanent magnets 13 having been arranged laterally in parallel, as shown in FIG. 3. Thus, the polybenzazole precursor in the unsolidified film 15 is oriented along the magnetic force lines 14, which extend linearly from the N pole of one permanent magnet 13 toward the S pole of the other permanent magnet 13.

The magnetic flux density of the magnetic field applied to the unsolidified film 15 is preferably 1 to 30 T, more preferably 2 to 25 T, and much more preferably 3 to 20 T. If the magnetic flux density is less than 1 T, the orientation degree of the polybenzazole precursor is apt to be insufficient, whereas even if the magnetic flux density is more than 30 T, the orientation degree of the polybenzazole precursor is not increased very much. A preferable atmosphere in which a magnetic field is applied to the unsolidified film 15 is that of dried air, nitrogen, argon, helium, or carbon dioxide. The application of a magnetic field is preferably carried out under reduced pressure.

After application of a magnetic field, the unsolidified film 15 is immersed in water. As a result, the unsolidified film 15 is solidified into the film 11. The water may be replaced by an aqueous solution of sodium hydroxide, or it may include methanol, ethanol, or acetone. During the time that the unsolidified film 15 is being solidified, a magnetic field may be applied to the unsolidified film 15.

The resultant film 11 is cleaned with a cleaning solution, such as water or warm water, so as to remove the unreacted acidic constituent, the unreacted amino-basic constituent, and inorganic salts. The cleaning is carried out in such a manner as to move the film 11 in the cleaning solution or to spray the cleaning solution on the film 11. The concentration of each of the unreacted acidic constituent, the unreacted amino-basic constituent, and the inorganic salts in the film 11 is preferably 500 ppm or less after the cleaning. If the concentration is more than 500 ppm, the quality of the film 11 can sometimes deteriorate.

After the cleaning, the film 11 is stripped off from the substrate 12, as the need arises. For example, it is stripped off from the substrate 12 for the film 11 to be used as a base material for a flexible printed wiring board, or as a base material for magnetic recording film. But on the other hand, it is not stripped off from the substrate 12 for the film 11 to be used as an insulating film for semiconductor, a sealing material, or an alignment layer for displays.

After the cleaning, the film 11 is dried before or after it is stripped off from the substrate 12. The drying is carried out by using a heated gas such as air, nitrogen, or argon, or by using radiant heat of an electric heater or an infrared lamp, or by using dielectric heating. Preferably the film is stretched tight to prevent the shrinkage of the film 11 during drying. The temperature at the time of drying is preferably 60 to 180° C., more preferably 80 to 130° C. If the temperature is lower than 60° C., the film 11 is not dried efficiently, whereas if the temperature is higher than 180° C., the quality of the film 11 can sometimes deteriorate.

The first embodiment of the present invention has the following advantages.

The polybenzazole precursor in the film 11 is strongly oriented in a given direction, compared with the polybenzazole in the polybenzazole film disclosed in Japanese National Phase Laid-Open Patent Publication No. 6-503521. This is not because the polybenzazole precursor is oriented by the mechanical orientation, but because it is oriented by the application of a magnetic field. Accordingly, the film 11 has strong anisotropy compared with the conventional polybenzazole film.

The method disclosed in Japanese National Phase Laid-Open Patent Publication No. 6-503521 permits the production of a polybenzazole film in which polybenzazole is oriented in the direction perpendicular to the thickness direction of the film 11, but not the production of polybenzazole films in which polybenzazole is oriented in the directions other than direction perpendicular to the thickness direction of the film 11. In contrast, according to the embodiment of the present invention, a film 11 can be obtained in which the polybenzazole precursor is oriented in any direction, including the direction of the thickness of the film 11 and the direction perpendicular to that of the thickness of the film 11, only by changing the relative positions of the permanent magnet 13 and the unsolidified film 15.

Now, a second embodiment of the present invention will be described mainly in connection with the different points from the first embodiment.

A polybenzazole film according to the second embodiment of the present invention is formed of polybenzazole having a repeating unit shown by the following chemical formula (3) or (4).

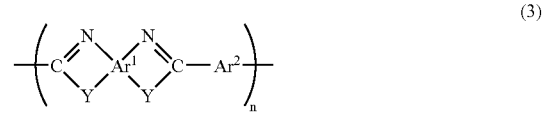

(3)

-continued

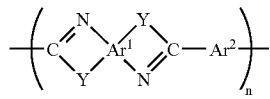
(4)

In the chemical formulae (3) and (4), Y is any one selected from the group consisting of a sulfur atom, an oxygen atom, and an imino group; $Ar^1$ is an aromatic hydrocarbon group shown by, for example, any one of the above chemical formulae (12) to (15); $Ar^2$ is an aromatic hydrocarbon group shown by, for example, any one of the above chemical formulae (8) to (11); and n is an integer of 10 to 500. Accordingly, the above polybenzazole means any one selected from the group consisting of, for example, polybenzoxazole (PBO), polybenzothiazole (PBT) and polybenzimidazole (PBI), or either block or random copolymer of at least two selected from the group consisting of benzoxazole, benzothiazole, and benzimidazole. The above polybenzazole may be a mixture of different kinds of polybenzazole.

PBO is a polymer that contains an oxazole ring bound to an aromatic hydrocarbon group, and one example thereof is poly(phenylene benzobisoxazole). PBT is a polymer that contains a thiazole ring bound to an aromatic hydrocarbon group, and one example thereof is poly(phenylene benzobisthiazole). PBI is a polymer that contains an imidazole ring bound to an aromatic hydrocarbon group, and one example thereof is poly(phenylene benzbisimidazole).

In the above polybenzazole film, the polybenzazole is oriented in a given direction. Accordingly, the polybenzazole film has at least one of optical anisotropy, magnetic anisotropy, mechanical anisotropy, thermal anisotropy, and electrical anisotropy.

The thickness of the polybenzazole film is preferably 1 μm to 2 mm.

Like the film 11 of the first embodiment, the polybenzazole film is used as, for example, an insulating film for semiconductor, a base material for printed wiring boards, a sealing material, an alignment layer for displays, a base material for polarized films, a base material for magnetic recording films, a base material for condensers, a solar battery, a flat heating element, a film for electromagnetic-wave preventive measures, a sensor, an actuator, a material for batteries, a material for package, a gas barrier material, a base material for laminated films, a filter, and a separation film.

Now the method of producing the polybenzazole film will be described.

In the production of the polybenzazole film, first, a solution of polybenzazole precursor is prepared in the same manner as in the first embodiment. Then an unsolidified film is produced from the resultant polybenzazole precursor solution in the same manner as in the first embodiment. Then a magnetic field is applied to the unsolidified film in the same manner as in the first embodiment.

After the application of a magnetic field, the unsolidified film is heated preferably at 100 to 450° C., more preferably at 150 to 450° C., and much more preferably 200 to 450° C. The polybenzazole precursor in the unsolidified film undergoes ring-closing reaction, due to the heating, into a polybenzazole. If the heating temperature is lower than 100° C., the polybenzazole precursor in the unsolidified film is not turned into a polybenzazole efficiently, whereas if the heating temperature is higher than 450° C., the quality of the polybenzazole film can sometimes deteriorate. During the heating, a magnetic field may be applied to the unsolidified film.

Preferably a ring-closing agent or a ring-closing catalyst is added to the polybenzazole precursor solution, because such agent or catalyst accelerates the ring-closing reaction of the polybenzazole precursor. Concrete examples of ring-closing agents are acid anhydrides, such as acetic anhydride, propionic anhydride, and benzoic anhydride, and dicyclohexylcarbodiimide. Concrete examples of ring-closing catalysts are pyridine, isoquinoline, trimethylamine, aminopyridine, and imidazole. Preferably 1 to 8 mol of the ring-closing agent or ring-closing catalyst is added to 1 mol of the acidic constituent. If the amount of the ring-closing agent or ring-closing catalyst added to 1 mol of acidic constituent is less than 1 mol, the ring-closing reaction is not accelerated very much, whereas if the amount of the ring-closing agent or ring-closing catalyst added to 1 mol of acidic constituent is more than 8 mol, the effect of accelerating the ring-closing reaction reaches a limit.

After subjecting the polybenzazole precursor in the unsolidified film to ring-closing reaction, the unsolidified film is immersed in water. As a result, the unsolidified film 15 is solidified into a polybenzazole film. The resultant polybenzazole film is cleaned, and it is stripped off from the substrate as the need arises. After the cleaning the polybenzazole film is dried before or after it is stripped off from the substrate.

The second embodiment of the present invention has the following advantages.

The polybenzazole in the polybenzazole film is strongly oriented in a given direction, compared with the polybenzazole in the polybenzazole film disclosed in Japanese National Phase Laid-Open Patent Publication No. 6-503521. Accordingly, the polybenzazole film has strong anisotropy compared with the conventional polybenzazole film.

According to the second embodiment of the present invention, a polybenzazole film can be obtained in which polybenzazole is oriented in any direction, including the direction of the thickness of the polybenzazole film and the direction perpendicular to that of the thickness of the polybenzazole film.

It should be apparent to those skilled in the art that the present invention may be embodied in many other specific forms without departing from the spirit or scope of the invention. Particularly, it should be understood that the invention may be embodied in the following forms.

The polybenzazole precursor may include not only the repeating unit shown by the above formula (1) or (2), but also another repeating unit that has a ring-closing portion other than $Ar^1$ and $Ar^2$.

The polybenzazole precursor may include another repeating unit where the XH group in the repeating unit shown by the above formula (1) or (2) is replaced by trialkylsilyl group. The trialkylsilyl group in the polybenzazole precursor can be replaced by XH group if the polybenzazole precursor is brought into contact with methanol or acid aqueous solution.

When the acidic constituent reacted with the amino-basic constituent in a solvent is dihalide of dicarboxylic acid shown by the formula (5), a tertiary amine, which functions as a hydrogen-halide trapping agent, such as pyridine, triethylamine, or dimethylaniline, may be added to the solvent.

To the polybenzazole precursor solution may be added a reinforcer such as glass fiber, a filler, a pigment, a dye, an optical whitening agent, a dispersant, a stabilizer, an ultraviolet absorber, an antistatic agent, an antioxidant, a thermal stabilizer, a lubricant, and a plasticizer.

The thickness and width of the film 11 shown in FIG. 3 are arbitrary.

One of the permanent magnets 13 shown in FIGS. 2 and 3 may be omitted.

In addition to the permanent magnets 13 shown in FIGS. 2 and 3, another permanent magnet may be added so that the unsolidified film 15 is exposed to magnetic force lines extending in the different directions from each other.

In the application of a magnetic field to the unsolidified film 15 shown in FIGS. 2 and 3, the unsolidified film 15 may be exposed to magnetic force lines that extend in curves. In this case, the polybenzazole precursor in the unsolidified film 15 is oriented along the magnetic force lines extending in curves.

The permanent magnets 13 shown in FIGS. 2 and 3 may be replaced by magnetic field generating elements other than permanent magnets 13, such as electromagnets, superconducting magnets, and coils.

The permanent magnets 13 shown in FIGS. 2 and 3 may be replaced by electric field generating elements. The electric field generating elements have, for example, electrodes and slide rheostat. In this case, the polybenzazole precursor in the unsolidified film 15 is oriented along the electric force lines generated by the electric field generating elements. The film produced by the application of an electric field, instead of a magnetic field, has strong anisotropy, like the film 11 of the first embodiment and the polybenzazole film of the second embodiment.

The solvent may be omitted when reacting the acidic constituent and the amino-basic constituent. In this case, the mixture of the acidic constituent and the amino-basic constituent need to be melted, preferably at 200 to 450° C., more preferably at 200 to 300° C. If the temperature for melting is lower than 200° C., sometimes the acidic constituent and the amino-basic constituent will not melt sufficiently, whereas the temperature is higher than 450° C., the quality of the resultant polybenzazole film can sometimes deteriorate. After the reaction of the acidic constituent and the amino-basic constituent, a molten polybenzazole precursor is produced, instead of a polybenzazole precursor solution.

The starting material for producing a polybenzazole film may be a polybenzazole solution or a molten polybenzazole, instead of a polybenzazole precursor solution. In this case, heating treatment is omitted, which is conducted so as to subject a polybenzazole precursor to ring-closing reaction after the application of a magnetic field. When the starting material is a polybenzazole solution, the concentration of polybenzazole in the polybenzazole solution is preferably 2 to 30% by weight, more preferably 3 to 20% by weight, and much more preferably 5 to 20% by weight. If the concentration is less than 2% by weight, sometimes polybenzazole will not form a liquid crystal in the polybenzazole solution; as a result, it becomes difficult to obtain with certainty a polybenzazole film in which polybenzazole is oriented in a given direction. On the other hand, if the concentration is more than 30% by weight, the viscosity of the polybenzazole solution becomes too high; as a result, polybenzazole is hard to orient in a given direction.

The polybenzazole film may be produced in such a manner as to heat the film 11 of the first embodiment at 200 to 450° C. In this heating treatment, if the temperature is lower than 200° C., the polybenzazole precursor in the film 11 will not sufficiently undergo ring-opening reaction, whereas if the temperature is higher than 450° C., the quality of the resultant polybenzazole film can sometimes deteriorate.

In the following the present invention will be described in further detail taking Examples and Comparative Examples.

EXAMPLE 1

In Example 1, first, 1 g (4.624 mmol) of 4,4'-diamino-3,3'-dihydroxybiphenyl and 2.511 g (23.12 mmol) of chlorotrimethylsilane were added to a reactor, and then 2.560 g (32.36 mmol) of pyridine and 30.37 g of mixed solvent consisting of N,N-dimethylacetamide and hexamethylphosphortriamide were added to prepare a reaction solution. The ratio of N,N-dimethylacetamide and hexamethylphosphortriamide in the mixed solvent was 1:2 on a volume basis.

Then, 0.9387 g (4.624 mmol) of dichloride terephthalate was added to the above reaction solution little by little, and the reaction solution was stirred for 3 hours to give a silylated polyhydroxyamide solution, which contains silylated polyhydroxyamide as a polybenzazole precursor. The silylated polyhydroxyamide solution was observed under a polarizing microscope; as a result, it was ascertained that the silylated polyhydroxyamide solution had optical anisotropy.

Figure 4:
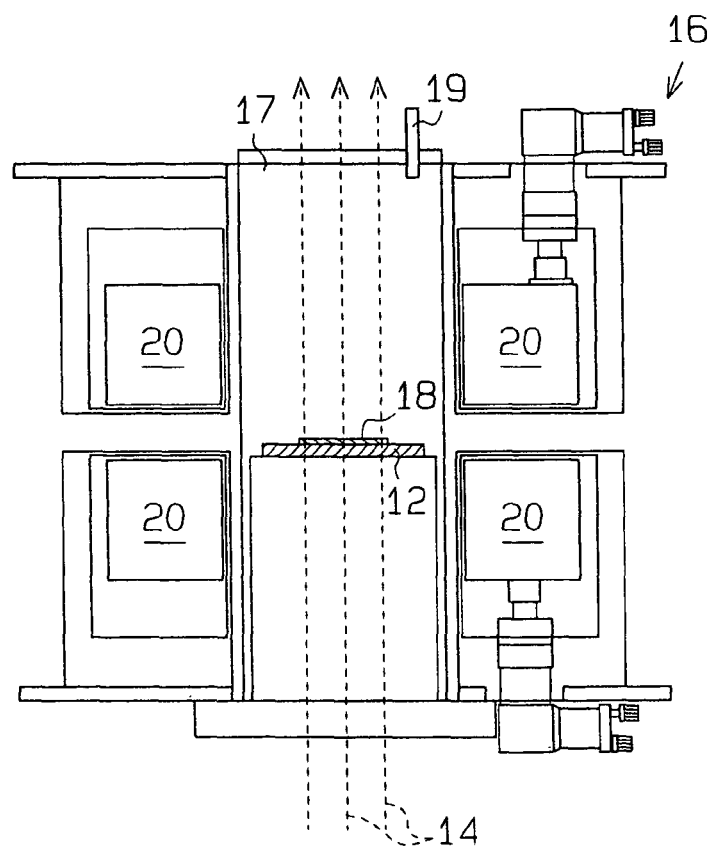
FIG. 4 is a schematic view of a magnetic field applying apparatus.

Then, the silylated polyhydroxyamide solution was applied on a substrate 12 by cast coating to prepare an unsolidified film 18 (see FIG. 4). A magnetic field was then applied to the unsolidified film 18 using a magnetic field applying apparatus 16 shown in FIG. 4.

The magnetic field applying apparatus 16 includes a chamber 17, which can be made airtight, and superconducting magnets 20. Since the chamber 17 is disposed between the superconducting magnets 20, magnetic force lines 14 extending vertically are generated in the chamber 17. The chamber 17 is connected with a pressure-reducing pipe 19, through which the air in the chamber 17 is evacuated, and thereby the chamber 17 can be depressurized.

The unsolidified film 18 was disposed in the chamber 17 in such a manner that the direction of the thickness of the unsolidified film 18 and the direction of the extension of the magnetic force lines 14 correspond to each other. After that, the chamber 17 was closed airtight and a magnetic field of 10 tesla was applied to the unsolidified film 18 for 30 minutes while reducing the pressure in the chamber 17 to 2.6 kPa (20 mmHg). Then the unsolidified film 18 together with substrate 12 were taken out from the chamber 17 and immersed in water for 1 hour to give a polybenzazole precursor film of 15 μm thick. The film obtained was dried at 110° C. for 2 hours and then stripped off from the substrate 12.

EXAMPLE 2

In Example 2, the unsolidified film 18 was disposed in the chamber 17 in such a manner that the direction of the thickness of the unsolidified film 18 and the direction of the extension of the magnetic force lines 14 were at right angles to each other. A polybenzazole precursor film was produced in the same manner as in Example 1 except the above point.

EXAMPLE 3

In Example 3, the polybenzazole precursor film of Example 1 was heated at 200° C. for 30 minutes, at 300° C. for 30 minutes and at 400° C. for 1 hour in the nitrogen atmosphere so that a polybenzazole film was produced from the polybenzazole precursor film of Example 1.

EXAMPLE 4

In Example 4, the polybenzazole precursor film of Example 2 was heated at 200° C. for 30 minutes, at 300° C. for 30 minutes and at 400° C. for 1 hour in the nitrogen atmosphere so that a polybenzazole film was produced from the polybenzazole precursor film of Example 2.

COMPARATIVE EXAMPLE 1

In Comparative Example 1, the polybenzazole precursor film production process of Example 1 was employed except that a step of applying a magnetic field to the unsolidified film 18 was omitted. A polybenzazole precursor film was produced in the same manner as in Example 1 except the above point.

COMPARATIVE EXAMPLE 2

In Comparative Example 2, the polybenzazole precursor film of Comparative Example 1 was heated at 200° C. for 30 minutes, at 300° C. for 30 minutes, and at 400° C. for 1 hour in the nitrogen atmosphere so that a polybenzazole film was produced from the polybenzazole precursor film of Comparative Example 1.

The polybenzazole precursor films and polybenzazole films obtained in the above Examples and Comparative Examples were observed under a polarizing microscope; as a result, it was ascertained that all the films had optical anisotropy.

While rotating the films of Examples 1 to 4 about an axis perpendicular to the direction of the films' thickness, the films were exposed to polarized infrared rays (P polarized light) traveling in the direction perpendicular to the axis. The absorption intensity of the polarized infrared rays was measured in the vicinity of 1500 cm$^{-1}$ and 1600 cm$^{-1}$ for each film. The measurement showed that the absorption intensity changed with the rotational angle of each film. In particular, when the polarization direction of the polarized infrared rays to which each film was exposed corresponded to the direction of the extension of the magnetic force lines in the magnetic field having been applied to each film at the time of its production, the above absorption intensity became a maximum. When the above polarization direction was at right angles to the direction of the extension of the magnetic force lines, the above absorption intensity became a minimum. This suggests that the polybenzazole precursor or polybenzazole in each of the films of Examples 1 to 4 was oriented along the magnetic force lines in the magnetic field having been applied to the film at the time of its production.

On the other hand, in the films of Comparative Examples 1 and 2, the absorption intensity did not change very much with the rotational angle of the films. This suggests that the polybenzazole precursor or polybenzazole in each of the films of Comparative Examples 1 and 2 was oriented along the plane at right angles to the direction of each film's thickness, but existed at random in the plane.

For each of the films of Examples 1 to 4 and Comparative Examples 1 and 2, magnetic susceptibility $\chi z$ in the direction of the thickness of each film, or in the Z-axis direction, magnetic susceptibility $\chi x$ in the X-axis direction, perpendicular to the Z-axis direction, and magnetic susceptibility $\chi y$ in the Y-axis direction, perpendicular to the X-axis and Z-axis directions, were measured with a superconducting quantum interference device, "MPMS-5" (trade name, from Quantum Design). The values of anisotropy magnetic susceptibility "$\chi z - \chi x$" and "$\chi x - \chi y$" were calculated from the measured magnetic susceptibility values.

For each of the pieces 3 mm long×7 mm wide cut away from the films of Examples 2 and 4, its coefficient of linear expansion was measured with a thermomechanical analyzer, "TMA 50", by Shimadzu Corporation. Each piece was fixed with two chucks spaced at 5 mm. During the measurement, 1 g of load was applied to each piece. For the piece derived from the film of Example 2, measurement of the coefficient of linear expansion was carried out while heating the piece at a temperature in the range of 30 to 160° C. For the piece derived from the film of Example 4, measurement of the coefficient of linear expansion was carried out while heating the piece at a temperature in the range of 30 to 400° C. The temperature rising rate during the heating was 10° C./min.

The measured results are shown in Table 1 and Table 2 below.

TABLE 1

|  |  | Example 1 | Example 2 | Example 3 | Example 4 |
|---|---|---|---|---|---|
| Type of Film | | polybenzazole precursor | polybenzazole precursor | polybenzazole | polybenzazole |
| Magnetic Flux Density in Applied Magnetic Field | | 10 T | 10 T | 10 T | 10 T |
| Direction of Line of Magnetic Force | | Z-axis direction | X-axis direction | Z-axis direction | X-axis direction |
| Direction of Orientation | | Z-axis direction | X-axis direction | Z-axis direction | X-axis direction |
| Magnetic Susceptibility $\chi x$ (emu/g) | | $-2.54 \times 10^{-6}$ | $-1.04 \times 10^{-6}$ | $-1.36 \times 10^{-6}$ | $-1.45 \times 10^{-6}$ |
| Magnetic Susceptibility $\chi y$ (emu/g) | | $-2.59 \times 10^{-6}$ | $-1.11 \times 10^{-6}$ | $-1.39 \times 10^{-6}$ | $-1.59 \times 10^{-6}$ |
| Magnetic Susceptibility $\chi z$ (emu/g) | | $-2.43 \times 10^{-6}$ | $-1.10 \times 10^{-6}$ | $-1.30 \times 10^{-6}$ | $-1.50 \times 10^{-6}$ |
| Anisotropic Magnetic Susceptibility (emu/g) | | $11.2 \times 10^{-8}$ ($\chi z - \chi x$) $4.93 \times 10^{-8}$ ($\chi x - \chi y$) | $-6.43 \times 10^{-8}$ ($\chi z - \chi x$) $6.79 \times 10^{-8}$ ($\chi x - \chi y$) | $5.17 \times 10^{-8}$ ($\chi z - \chi x$) $3.23 \times 10^{-8}$ ($\chi x - \chi y$) | $-4.85 \times 10^{-8}$ ($\chi z - \chi x$) $13.7 \times 10^{-8}$ ($\chi x - \chi y$) |
| Coefficient of Linear Expansion (/K) | X-axis direction | — | $-3.29 \times 10^{-6}$ | — | $-5.21 \times 10^{-6}$ |
| | Y-axis direction | — | $1.84 \times 10^{-6}$ | — | $1.18 \times 10^{-6}$ |

TABLE 2

|  | Comparative Example 1 | Comparative Example 2 |
|---|---|---|
| Type of Film | polybenzazole precursor | polybenzazole |
| Magnetic Flux Density in Applied Magnetic Field | — | — |
| Direction of Line of Magnetic Force | — | — |
| Direction of Orientation | oriented along a specified plane | oriented along a specified plane |
| Magnetic Susceptibility $\chi x$ (emu/g) | $-1.31 \times 10^{-6}$ | $-1.11 \times 10^{-6}$ |
| Magnetic Susceptibility $\chi y$ (emu/g) | $-1.26 \times 10^{-6}$ | $-1.14 \times 10^{-6}$ |
| Magnetic Susceptibility $\chi z$ (emu/g) | $-1.39 \times 10^{-6}$ | $-1.37 \times 10^{-6}$ |
| Anisotropic Magnetic Susceptibility (emu/g) | $-7.62 \times 10^{-8}$ ($\chi z - \chi x$) $-5.34 \times 10^{-8}$ ($\chi x - \chi y$) | $-25.5 \times 10^{-8}$ ($\chi z - \chi x$) $3.76 \times 10^{-8}$ ($\chi x - \chi y$) |
| Coefficient of Linear Expansion (/K) X-axis direction | $-9.80 \times 10^{-6}$ | $-7.88 \times 10^{-6}$ |
| Coefficient of Linear Expansion (/K) Y-axis direction | $-9.20 \times 10^{-6}$ | $-6.94 \times 10^{-6}$ |

As shown in Table 1, in the films of Example 1 and Example 3, the magnetic susceptibility $\chi z$ is significantly large compared with the magnetic susceptibility $\chi x$ and the magnetic susceptibility $\chi y$. This suggests that the films of Example 1 and Example 3 had magnetic anisotropy. In the films of Example 2 and Example 4, the magnetic susceptibility $\chi x$ is significantly large compared with the magnetic susceptibility $\chi y$ and the magnetic susceptibility $\chi z$ and the coefficient of linear expansion in the Y-axis direction is significantly small compared with that in the X-axis direction. This suggests that the films of Example 2 and Example 4 had both magnetic anisotropy and thermal anisotropy.

As shown in Table 2, in the films of Comparative Example 1 and Comparative Example 2, there are no significant differences between the magnetic susceptibility $\chi x$ and the magnetic susceptibility $\chi y$ and between the coefficient of linear expansion in the X-axis direction and that in the Y-axis direction. This suggests that the films of Comparative Example 1 and Comparative Example 2 had neither magnetic anisotropy nor thermal anisotropy in the plane perpendicular to the thickness direction of the films, or in the plane perpendicular to the Z-axis direction.

The invention claimed is:

1. A method of producing a film formed of a polybenzazole precursor, the polybenzazole precursor having a repeating unit shown by the following chemical formula (1) or (2),

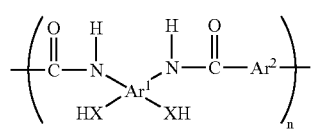
(1)

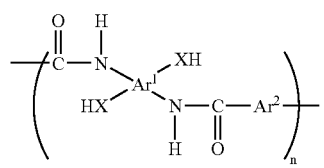
(2)

wherein X is any one selected from the group consisting of a sulfur atom, an oxygen atom, and an imino group; $Ar^1$ and $Ar^2$ are selected from aromatic hydrocarbon groups; and n is an integer of 10 to 500, comprising:

preparing a liquid containing the polybenzazole precursor, the concentration of the polybenzazole precursor in the liquid being 2–30% by weight;

spreading the liquid in the form of a film;

applying a magnetic or electric field to the spread liquid in such a manner that the polybenzazole precursor in the spread liquid is oriented along a direction of the magnetic or electric field; and solidifying the spread liquid after the application of the magnetic or electric field.

2. The method according to claim 1, wherein said liquid is a solution of the polybenzazole precursor prepared by dissolving the polybenzazole precursor in a solvent.

3. A method of producing a film formed of a polybenzazole, comprising:

preparing a liquid containing a polybenzazole precursor, as a precursor of the polybenzazole, the polybenzazole precursor having a repeating unit shown by the following chemical formula (1) or (2),

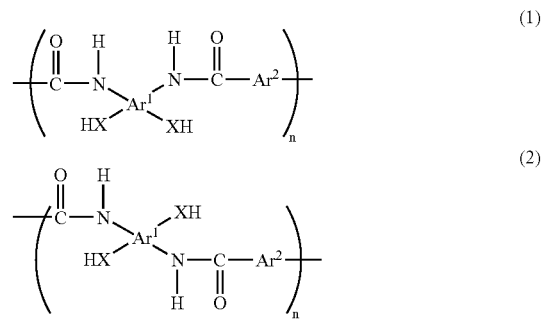

wherein X is any one of selected from the group consisting of a sulfur atom, an oxygen atom, and an amino group consisting of a sulfur atom, an oxygen atom, and an imino group; $Ar^1$ and $Ar^2$ are selected from aromatic hydrocarbon groups; and n is an integer of 10 to 500, the concentration of the polybenzazole precursor in the liquid being 2–30% by weight;

spreading the liquid in the form of a film;

applying a magnetic or electric field to the spread liquid in such a manner that the polybenzazole precursor in the spread liquid is oriented along a direction of the magnetic or electric field;

chemically converting the polybenzazole precursor in the spread liquid into the polybenzazole after the application of the magnetic or electric field; and solidifying the spread liquid after the chemical conversion of the polybenzazole precursor into the polybenzazole.

4. The method according to claim 3, wherein said liquid is a solution of the polybenzazole precursor prepared by dissolving the polybenzazole precursor in a solvent.

5. A method of producing a film formed of a polybenzazole, comprising:

preparing a liquid containing a polybenzazole precursor, as a precursor of the polybenzazole, the polybenzazole precursor having a repeating unit shown by the following chemical formula (1) or (2),

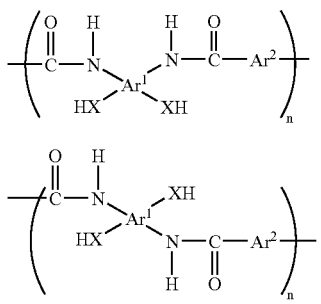

(1)

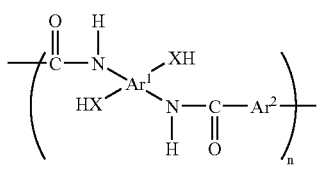

(2)

wherein X is any one selected from the group consisting of a sulfur atom, an oxygen atom, and an imino group; $Ar^1$ and $Ar^2$ are selected from aromatic hydrocarbon groups; and n is an integer of 10 to 500, the concentration of the polybenzazole precursor in the liquid being 2–30% by weight;

spreading the liquid in the form of a film;

applying a magnetic or electric field to the spread liquid in such a manner that the polybenzazole precursor in the spread liquid is oriented along a direction of the magnetic or electric field;

solidifying the spread liquid after the application of the magnetic or electric field so as to produce a precursor film, as a film of the polybenzazole precursor; and chemically converting the polybenzazole precursor contained in said precursor film into the polybenzazole.

6. The method according to claim 5, wherein said liquid is a solution of the polybenzazole precursor prepared by dissolving the polybenzazole precursor in a solvent.

7. A method of producing a film formed of a polybenzazole; comprising:

preparing a liquid containing the polybenzazole, the concentration of the polybenzazole precursor in the liquid being 2–30% by weight;

spreading the liquid in the form of a film;

applying a magnetic or electric field to the spread liquid in such a manner that the polybenzazole in the spread liquid is oriented along a direction of the magnetic or electric field; and solidifying the spread liquid after the application of the magnetic or electric field.

8. The method according to claim 7, wherein said polybenzazole has a repeating unit shown by the following chemical formula (3) or (4),

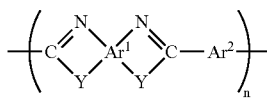

(3)

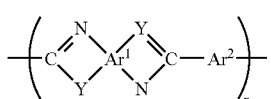

(4)

wherein Y is any one selected form the group consisting of a sulfur atom, an oxygen atom, and an imino group; $Ar^1$ and $Ar^2$ are selected from aromatic hydrocarbon groups; and n is an integer of 10 to 500.

9. The method according to claim 7, wherein the liquid is a solution of the polybenzazole prepared by dissolving the polybenzazole in a solvent.

10. The method according to claim 1, wherein the magnetic or electric field is applied to improve the anisotropy of the film to be formed.

11. The method according to claim 3, wherein the magnetic or electric field is applied to improve the anisotropy of the film to be formed.

12. The method according to claim 5, wherein the magnetic or electric field is applied to improve the anisotropy of the film to be formed.

13. The method according to claim 7, wherein the magnetic or electric field is applied to improve the anisotropy of the film to be formed.

14. The method according to claim 1, wherein the polybenzazole precursor is uniaxially oriented by the application of the magnetic or electric field.

15. The method according to claim 3, wherein the polybenzazole precursor is uniaxially oriented by the application of the magnetic or electric field.

16. The method according to claim 5, wherein the polybenzazole precursor is uniaxially oriented by the application of the magnetic or electric field.

17. The method according to claim 7, wherein the polybenzazole is uniaxially oriented by the application of the magnetic or electric field.

18. The method according to claim 3, wherein the chemical conversion of the polybenzazole precursor is performed by heating the spread liquid at 100 to 450° C.

19. The method according to claim 5, wherein the chemical conversion of the polybenzazole precursor is performed by heating the spread liquid at 100 to 450° C.

20. The method according to claim 1, wherein the preparation of the liquid includes causing a condensation reaction between a dicarboxylic acid having the following formula (5) or the amide-forming derivative thereof and a compound having the following formula (6) or (7) so as to obtain the polybenzazole precursor,

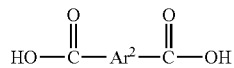

(5)

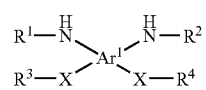

(6)

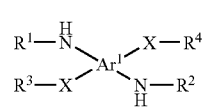

(7)

wherein each of $R^1$, $R^2$, $R^3$, and $R^4$, independently, is selected from the group consisting of trialkylsilyl groups and hydrogen.

21. The method according to claim 3, wherein the preparation of the liquid includes causing a condensation reaction between a dicarboxylic acid having the following formula (5) or the amide-forming derivative thereof and a compound having the following formula (6) or (7) so as to obtain the polybenzazole precursor,

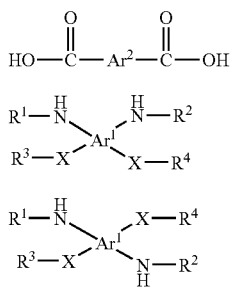

(5)

(6)

(7)

wherein each of $R^1$, $R^2$, $R^3$, and $R^4$, independently, is selected from the group consisting of trialkylsilyl groups and hydrogen.

22. The method according to claim 5, wherein the preparation of the liquid includes causing a condensation reaction between a dicarboxylic acid having the following formula (5) or the amide-forming derivative thereof and a compound having the following formula (6) or (7) so as to obtain the polybenzazole precursor,

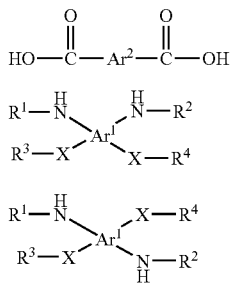

(5)

(6)

(7)

wherein each of $R^1$, $R^2$, $R^3$, and $R^4$, independently, is selected from the group consisting of trialkylsilyl groups and hydrogen.

23. The method according to claim 7, wherein the preparation of the liquid includes causing a condensation reaction between a dicarboxylic acid having the following formula (5) or the amide-forming derivative thereof and a compound having the following formula (6) or (7) so as to obtain the polybenzazole precursor,

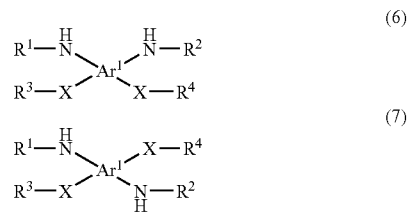

(6)

(7)

wherein each of $R^1$, $R^2$, $R^3$, and $R^4$, independently, is selected from the group consisting of trialkylsilyl groups and hydrogen.

24. The method according to claim 1, wherein the magnetic field where the magnetic flux density is 1 to 30 telsa is applied to the spread liquid.

25. The method according to claim 3, wherein the magnetic field where the magnetic flux density is 1 to 30 telsa is applied to the spread liquid.

26. The method according to claim 5, wherein the magnetic field where the magnetic flux density is 1 to 30 telsa is applied to the spread liquid.

27. The method according to claim 7, wherein the magnetic field where the magnetic flux density is 1 to 30 telsa is applied to the spread liquid.

* * * * *